(No Model.) 3 Sheets—Sheet 2.

B. J. ARNOLD.
PULLEY CONNECTING DEVICE.

No. 463,675. Patented Nov. 24, 1891.

Witnesses    Inventor (No Model.) 3 Sheets—Sheet 3.

B. J. ARNOLD.
PULLEY CONNECTING DEVICE.

No. 463,675. Patented Nov. 24, 1891.

Witnesses: Inventor:

UNITED STATES PATENT OFFICE.

BION J. ARNOLD, OF CHICAGO, ILLINOIS.

PULLEY-CONNECTING DEVICE.

SPECIFICATION forming part of Letters Patent No. 463,675, dated November 24, 1891.

Application filed April 17, 1891. Serial No. 389,325. (No model.)

*To all whom it may concern:*

Be it known that I, BION J. ARNOLD, a citizen of the United States, residing at Chicago, in the county of Cook and State of Illinois, have invented a new and useful Improvement in Pulley-Connecting Devices, of which the following is a full, clear, and exact specification.

My invention relates to means for operatively connecting a normally-idle power-transmitting part to the driving-shaft which it is associated with or encircles, and has for its object to provide convenient means whereby a pulley, generator, or other power-delivering device may be thus secured to a main-line driving-shaft in a convenient and satisfactory manner.

My invention is illustrated in the accompanying drawings, wherein—

Figure 1:
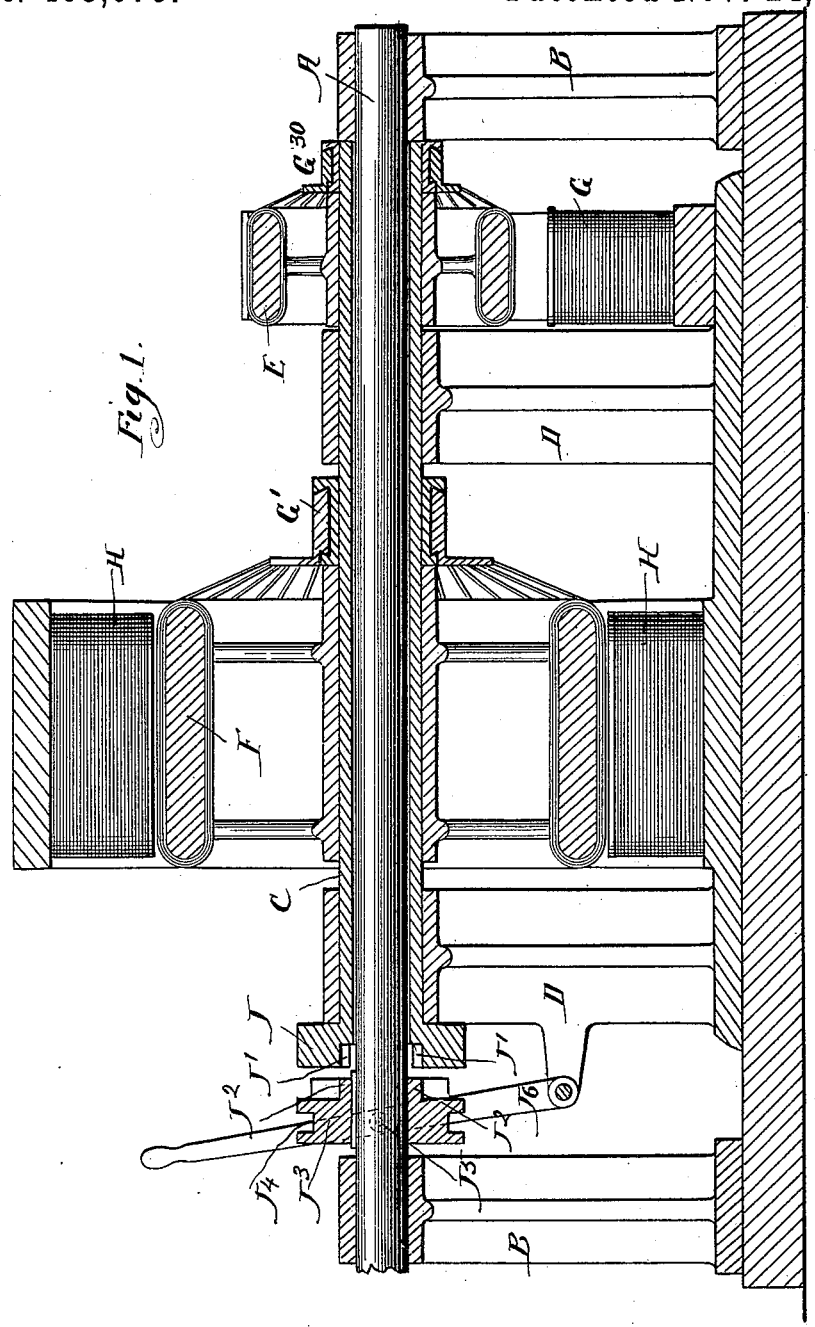
Figure 2:
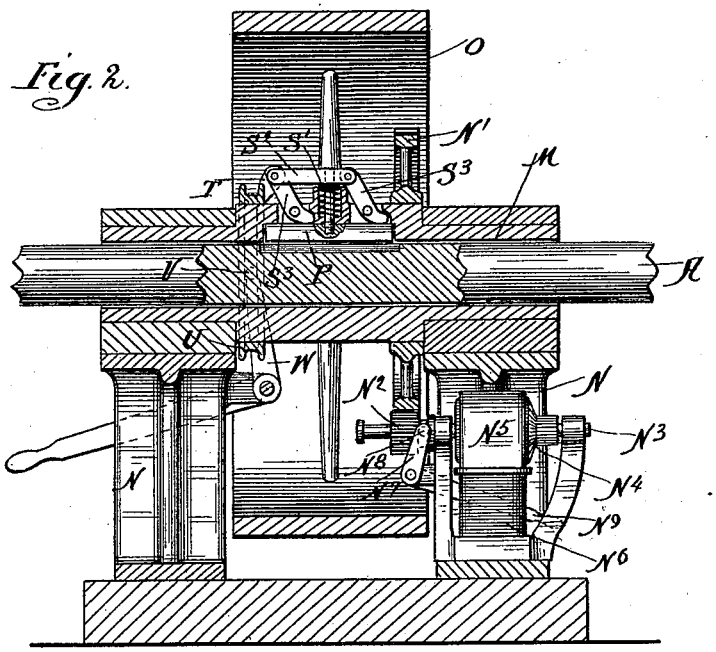
Figure 3:
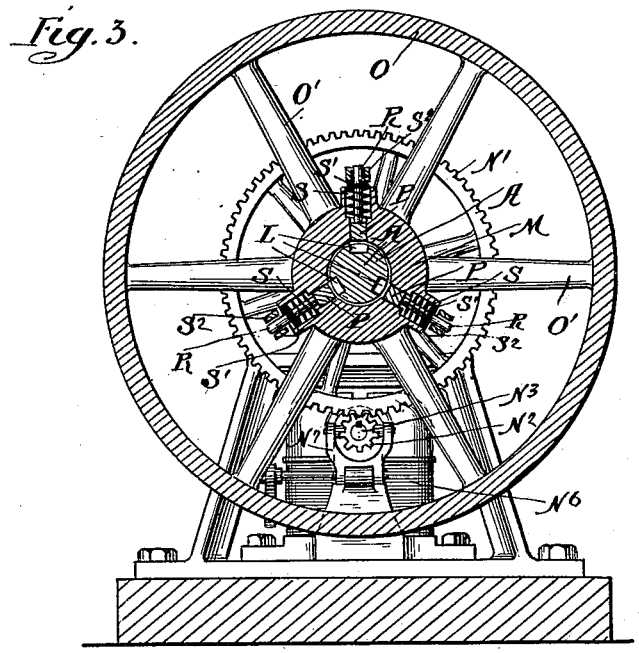
Figure 6:
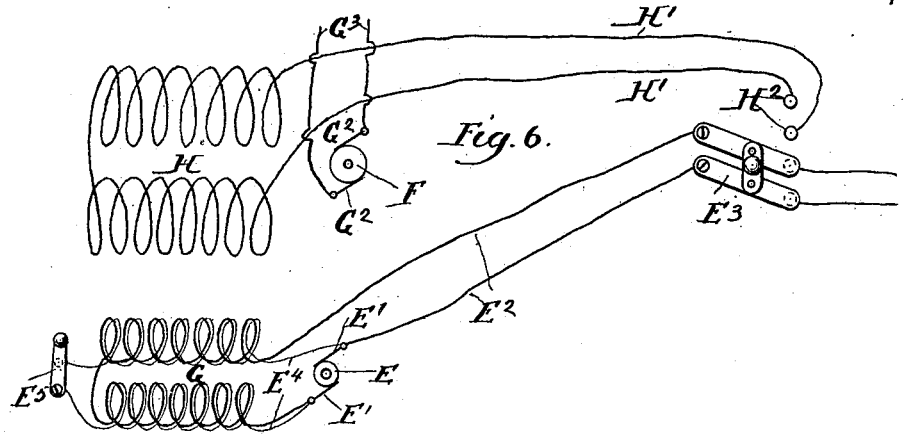
Figure 7:
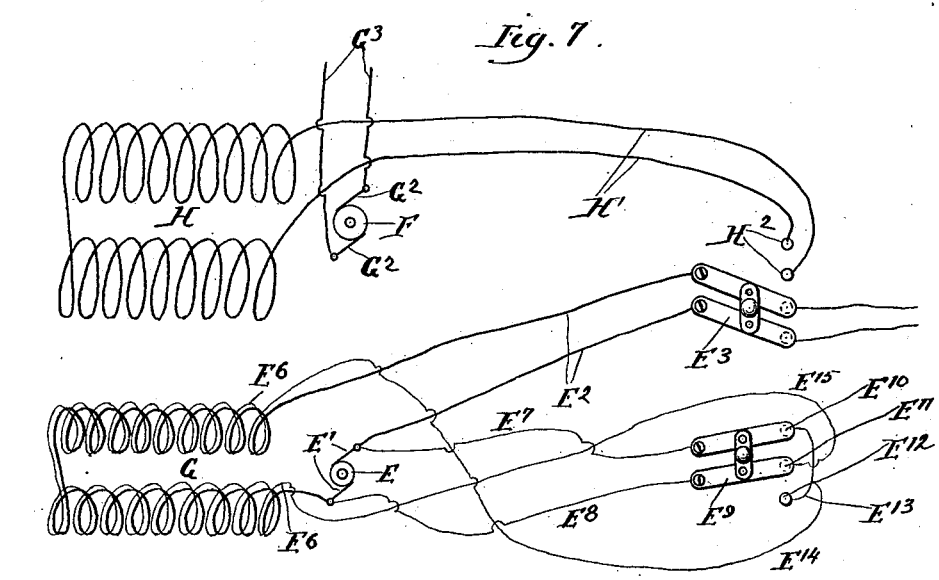
Figure 4:
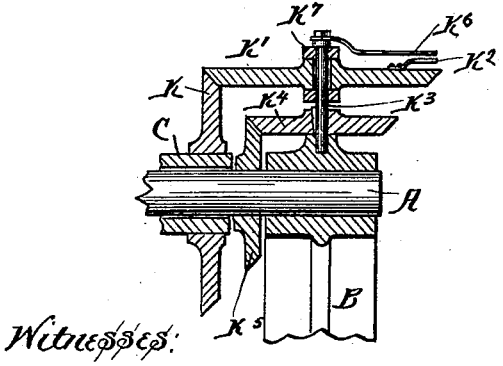
Figure 5:
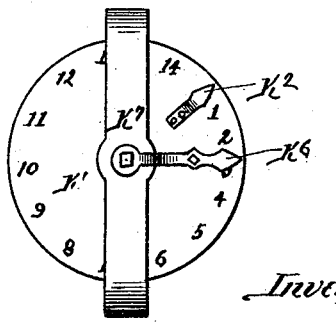

Figure 1 is a side elevation part sectional view of means for connecting the armature of a main generator with the main driving-shaft. Fig. 2 is a longitudinal section of a device for connecting a pulley. Fig. 3 is a cross-section through the pulley-connecting device. Fig. 4 is a cross-section through the indicator. Fig. 5 is a plan view thereof. Fig. 6 is a diagrammatic view of the circuits of the apparatus shown in Fig. 1. Fig. 7 is a similar diagrammatic view in which the motor-generator is provided with shunt-windings always traversed by current.

Like parts are indicated by like letters in all of the figures.

A is the main driving-shaft supported in bearings B B, and C is a sleeve thereon concentric therewith, but having an internal bore slightly larger in cross-section than the diameter of the shaft. This sleeve is supported in the bearings D D, and, as shown in Fig. 1, carries two armatures E and F, rigid thereon and rotating therewith. The armature E is associated with the field-magnets G, and the armature F is associated with the field-magnets H H.

G and G' are the commutators.

The sleeve C terminates at one end in an enlarged part J, having the slots J' J' adapted to receive the feathers $J^2$ $J^2$ on the sliding clutch $J^3$. This clutch has a circumferential groove $J^4$, in which rest one or more pins $J^5$, preferably carrying one or more rollers on the pivoted lever $J^6$. On the opposite end of the sleeve may be secured the beveled gear K, meshing with the horizontal gear K' which on its upper side assumes the form of a dial, as is indicated, and is provided with a pointer $K^2$. This gear is journaled upon the vertical pin $K^3$, which carries the inner gear $K^4$, which in turn meshes with the gear $K^5$ on the end of the shaft A. The gears K and K' and $K^4$ and $K^5$ should be of the same size. On the upper extremity of the pin $K^3$ is secured the pointer $K^6$. The pin is supported at its upper extremity by the cross-bar $K^7$.

In the modifications the shaft A is provided with three longitudinal slots L L, and is surrounded by a sleeve M, which is in like manner journaled concentric with the shaft on the bearings N N. Rigid on this sleeve is the gear-wheel N', which meshes with the pinion $N^2$ on the short shaft $N^3$, which carries the armature $N^4$ of the motor $N^5$, having field-magnets $N^6$. The gear $N^2$ is capable of moving along the shaft $N^3$, and this motion is accomplished by means of the elbow-crank lever $N^7$, which has one end $N^8$ to engage the gear, and is provided at the other end with the handle $N^9$.

O is the pulley secured by its spokes O' O' to the sleeve. On the inside of the pulley and parallel therewith are three keys P P, secured to rods R R, which are outwardly forced by the springs S S, which encircle them so to keep the keys retracted within the sleeve. The end of each of the rods R has a collar S' S', against which the spring S bears, so that such spring normally holds the key within the sleeve, as above stated. The arms $S^3$ $S^3$ are pivoted to the sleeve, as shown. The bar $S^2$ is provided with a slot to receive the rod R. Secured to one end of this bar is the arm T, which is secured also to the sliding grooved wheel U. In the groove of this wheel lies the pin V, preferably carrying a pulley on one end of the pivoted elbow crank-lever W.

$G^2$ $G^2$ are the brushes of the generator-armature F, which lead to the working-circuit conductors $G^3$ $G^3$. The field-magnet coils H H lead by the conductors H' H' to the contact-points $H^2$ $H^2$.

E' E' are the brushes of the motor-generator. This motor-generator is series wound by the conductor $E^2$, which leads to the double-pole switch $E^3$.

$E^4$ is a shunt-conductor leading from the brushes E' E' along the field-magnets G G and provided with a switch $E^5$, whereby such shunt-circuit may be opened or closed.

$E^6$ is a shunt-conductor about the field-magnets G G. The two branches of this conductor $E^7$ $E^8$ lead from the two brushes $E'$ $E'$ to the reversing-switch $E^9$, as shown. This switch is provided with the three contact-points $E^{10}$ $E^{11}$ $E^{12}$.

$E^{10}$ and $E^{12}$ are connected by the short conductor $E^{13}$, from which leads the conductor $E^{14}$ to the shunt-circuit $E^6$. From the contact-point $E^{11}$ leads the conductor $E^{15}$ to the shunt-circuit $E^6$.

The use and operation of my invention are as follows: Referring first to the devices shown in Fig. 1, it is assumed that the line driving-shaft A is constantly in motion from some driving source not indicated here, and that it is traveling at a comparatively uniform speed, such as is required for ordinary work. My device is applicable where a series of power-giving parts are to be energized from time to time, as occasion requires, from this driving-shaft. It is desirable, however, that the pulley with its belt or generator with its armature to be driven by such shaft be not suspended thereon, and at least not when the said pulley or armature is idle. Hence the part to be rotated is supported upon a sleeve concentric with, but not bearing upon, the shaft. If now it be desired to start such moving part, it could be coupled to the shaft by a friction-clutch; but this method is open to some objections. One of the difficulties in the application of other forms is that involved in giving to the part to be driven by the shaft a rotation equal to the shaft and then locking the two together. I provide, therefore, the motor having the field-magnet G and armature E, the said armature being rigid on the sleeve. If now a current be supplied to this motor, it will set the sleeve in rotation, thus rotating the armature of the main generator to be driven by the shaft. This rotation will continue until such armature and sleeve has reached the same speed of rotation as the shaft. This will be determined by examining the indicator, for the shaft and sleeve will be rotating at the same speed when the two indicator-hands $K^2$ $K^6$ remain together or at a uniform distance from each other while moving. This will result from the organization of the indicator, in which the gears K K' are of equal diameter, and the gears $K^4$ $K^4$ are also of equal diameter. When this point has been reached, the sliding clutch or pulley $J^3$ may be moved by the handle $J^6$ toward the sleeve-head J and held thereagainst until the feathers $J^2$ $J^2$ engage the slots J' J', whereupon it will be found that the sleeve and shaft are locked together and are rotating at uniform speed, carrying with them the armature F of the main generator. Load may now be thrown onto the generator when it will begin to supply suitable current, as in the case of ordinary dynamos. If it be desired now to separately excite the field of the main generator and if the machine is wound for this purpose, it may be done by throwing the switch $E^3$ over onto the contacts $H^2$ $H^2$, whereupon the fields H H of the main dynamo will be in series with the motor, which may now serve as a generator, since its armature, being locked to the sleeve, is driven by an independent power. The shunt-circuit (shown in Fig. 6) controlled by the switch $E^5$ should normally be open when the machine is run as a motor; but it may now be closed, whereupon the motor will become a shunt-wound generator. In Fig. 7 a similar relation is shown, except that here the shunt-winding of the motor-generator is so organized as that the shunt-circuit is closed all the time. In this event the circuit through the armature is reversed, or, that is to say, the current therethrough is traveling in one direction while the device is operating as a motor and in the opposite direction when the device is operating as an exciting-generator. The shunt-circuit must, however, be always in the same direction, and this is done by moving the reversing-switch $E^9$. When the current in the armature is reversed, as a result of the change from motor to generator, the shunt-circuit is reversed by moving the switch. When the motor is being driven by a current, the current-shunt through the fields will flow over conductor $E^7$, through the switch on conductor $E^{14}$, and thence through the field-magnets. When the motor is operating as a generator, this current would tend to flow in the opposite direction by reason of the reversal of the current in the armature, and if the parts remained in position the shunt-current could be reversed; but by sliding the switch to its contact-points $E^{11}$ $E^{13}$ the current will flow from the opposite brush on the conductor $E^8$ to conductor $E^{14}$, and thence through the field-magnet coils in the same direction.

The modified form shown in Figs. 2 and 3 operates as follows: The small motor is made to drive the gear $N^2$, which drives the large gear N', which in turn drives the pulley O and sleeve M. The indicator may also be applied to this device. When the parts have reached the same speed of rotation, the elbow crank-lever W is moved by means of its handle, and thus the pulley N is moved toward the right. This, however, raises the arm $S^3$ $S^3$, but their downwardly-projecting points force the keys P P against the action of the springs S S into the slots L L, whereby the sleeve and shaft are locked together, so as to rotate together. The elbow-keys may then be locked into position in any desired manner, and the motor $N^5$ may be stopped by sliding the pinion $N^2$ on the shaft $N^3$ out of engagement with the gear N' or made to act as an exciter for the dynamo which the pulley O drives by having its circuits connected, as before described. The motor may be arranged so that it drives the pulley O or sleeve C by gearing friction or by belt.

The devices here illustrated may of course be greatly altered without departing from the spirit of my invention, and I do not wish to be limited to the specific form and construction here shown.

I claim—

1. The combination of a main driving-shaft with a power-transmitting device associated therewith and adapted to be driven thereby, a motor independent of the driving-shaft adapted to drive such power-transmitting device until its speed is equal to that of the shaft, and a lock adapted to lock the shaft and power-transmitting device together when their speeds thus become equal.

2. The combination of a driving-shaft with a power-transmitting device associated therewith and adapted to be driven thereby, an independent electric motor connected with so as to drive such power-transmitting device, and a lock to lock the said device and shaft together when their speeds have become equal.

3. The combination of a driving-shaft with a movable part, an electric generator associated therewith and adapted to be driven thereby, an independent motor connected with so as to drive such movable part and bring it up to the speed of the shaft, and a lock to lock the shaft and movable part together when their speeds thus become equal.

4. The combination of a driving-shaft with a movable part, an electric generator associated therewith and adapted to be driven thereby, an independent motor connected with so as to drive such movable part and bring it up to the speed of the shaft, and a lock to lock the shaft and movable part together when their speeds thus become equal, said motor adapted to be connected with the field-magnets of the generator, so as to excite the same.

5. The combination of a driving-shaft with a movable part, an electric generator associated therewith and adapted to be driven thereby, an independent motor connected with so as to drive such movable part and bring it up to the speed of the shaft, and a lock to lock the shaft and movable part together when their speeds thus become equal, the movable part of said motor adapted to be locked to the shaft and driven thereby, so that such motor can also act as a generator.

6. The combination of a driving-shaft with a movable part, an electric generator associated therewith and adapted to be driven thereby, an independent motor connected with so as to drive such movable part and bring it up to the speed of the shaft, and a lock to lock the shaft and movable part together when their speeds thus become equal, the movable part of said motor adapted to be locked to the shaft and driven thereby, so that such motor can also act as a generator, and connections from such motor to the field-magnets of the generator, so that the motor is adapted, when operating as a generator, to excite the fields of the main generator.

7. The combination of a driving-shaft with a movable part, an electric generator associated therewith and adapted to be driven thereby, an independent motor connected with so as to drive such movable part and bring it up to the speed of the shaft, and a lock to lock the shaft and movable part together when their speeds thus become equal, the movable part of said motor adapted to be locked to the shaft and driven thereby, so that such motor can also act as a generator, and connections from such motor to the field-magnets of the generator, so that the motor is adapted, when operating as a generator, to excite the fields of the main generator, and a shunt-circuit about the field-magnets of the motor-generator, so that when operating as a generator the motor-generator may be shunt-wound.

8. The combination of a driving-shaft with a movable part, an electric generator associated therewith and adapted to be driven thereby, an independent motor connected with so as to drive such movable part and bring it up to the speed of the shaft, and a lock to lock the shaft and movable part together when their speeds thus become equal, the movable part of said motor adapted to be locked to the shaft and driven thereby, so that such motor can also act as a generator, and connections from such motor to the field-magnets of the generator, so that the motor is adapted, when operating as a generator, to excite the fields of the main generator, and a shunt-circuit about the field-magnets of the motor-generator, so that when operating as a generator the motor-generator may be shunt-wound, and a shunt-winding about the field-magnets of the motor-generator and a reversing-switch in circuit therewith, so that the motor-generator may be shunt-wound whether operating as a motor or generator.

9. The combination of a main driving-shaft with a generator having a movable part adapted to be driven by the shaft, a motor-generator having a movable part adapted to be driven by the shaft, said motor-generator supplied with an independent energizing-current and connected with the movable parts on the generator proper, so as to drive the same, and a lock whereby the movable part of the generator and the motor-generator may be coupled to the shaft when their speeds have become the same.

10. The combination of the main driving-shaft with a sleeve thereon and power-transmitting device secured upon the sleeve, and an indicator consisting of two movable parts, one driven by the shaft, the other by the sleeve, so that the relative motion of such movable parts will indicate the relative motion of the shaft and sleeve.

BION J. ARNOLD.

Witnesses:
CELESTE C. CHAPMAN,
H. M. DAY.